United States Patent
Martinez et al.

(10) Patent No.: US 12,109,927 B2
(45) Date of Patent: Oct. 8, 2024

(54) PORTABLE AND MODULAR VEHICLE TABLE ASSEMBLY

(71) Applicant: Ford Global Technologies, LLC, Dearborn, MI (US)

(72) Inventors: Oscar Martinez, Gustavo A. Madero (MX); Juan Carlos Aquino Bustamante, Gustavo A. Madero (MX); Misael Gonzalez, Mexico City (MX); Raul Ezequiel Alvarez Ruiz, Huixquilucan (MX); Jorge Flores Corona, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 17/941,267

(22) Filed: Sep. 9, 2022

(65) Prior Publication Data

US 2024/0083320 A1    Mar. 14, 2024

(51) Int. Cl.
*B60N 3/00* (2006.01)
*A47B 1/04* (2006.01)

(52) U.S. Cl.
CPC ............. *B60N 3/001* (2013.01); *A47B 1/04* (2013.01); *B60N 3/005* (2013.01)

(58) Field of Classification Search
CPC ........ B60N 3/001; B60N 3/002; B60N 3/005; A47B 1/04; A47B 5/04; A47B 23/02
See application file for complete search history.

(56) References Cited

U.S. PATENT DOCUMENTS

| | | | |
|---|---|---|---|
| 2,592,032 A * | 4/1952 | Henderson | B60N 3/002 108/45 |
| 2,746,821 A | 5/1956 | Schroeder | |
| 2,771,331 A * | 11/1956 | Messman | B60N 3/002 108/45 |
| 5,177,665 A | 1/1993 | Frank et al. | |
| 5,386,785 A | 2/1995 | Naor | |
| 5,487,521 A | 1/1996 | Callahan | |
| 5,511,493 A | 4/1996 | Kanehl, Jr. | |
| 5,558,026 A | 9/1996 | Seibert | |
| 5,755,411 A * | 5/1998 | Strong, III | B60N 3/007 248/118 |
| 5,845,585 A | 12/1998 | Meeus et al. | |

(Continued)

FOREIGN PATENT DOCUMENTS

CN    105584429 A    5/2016

*Primary Examiner* — Daniel J Rohrhoff
(74) *Attorney, Agent, or Firm* — Vichit Chea; Price Heneveld LLP (57) ABSTRACT

A table assembly for a vehicle includes a first mounting bracket attachable on a first fixed vehicle component and a table body. The table body has a plurality of rigid segments joined together by a corresponding plurality of flexible joints. A first one of the flexible joints extends in a first direction and at least another of the flexible joints extends in a second direction perpendicular to the first direction. The table body is configured to be removably coupled with the first mounting bracket such that the first mounting bracket supports the table body in a generally horizontal position with the table body in a first configuration folded along the first flexible joint such that the at least another of the flexible joints is positioned to extend along one of the plurality of rigid segments.

19 Claims, 11 Drawing Sheets

(56) References Cited

U.S. PATENT DOCUMENTS

| | | | |
|---|---|---|---|
| 6,036,158 A | 3/2000 | Raasch | |
| D437,273 S | 2/2001 | Chen | |
| 6,192,806 B1 | 2/2001 | Chen | |
| 6,279,800 B1 | 8/2001 | Lee | |
| 6,412,425 B1 | 7/2002 | Chen | |
| 6,494,148 B1 * | 12/2002 | Mullaney | B60N 3/005 108/47 |
| D510,306 S | 10/2005 | Swan et al. | |
| 7,334,768 B1 * | 2/2008 | Lum | A47B 23/04 248/444 |
| 8,079,312 B2 | 12/2011 | Long | |
| 8,327,774 B1 | 12/2012 | Rivera | |
| D784,059 S | 4/2017 | Berkowiz | |
| 9,908,448 B2 * | 3/2018 | Van Blarcom | B60R 11/0252 |
| 10,369,935 B1 * | 8/2019 | Petrie | B60N 3/005 |
| 10,744,950 B1 * | 8/2020 | Meyer | B60R 11/00 |
| 11,724,630 B1 * | 8/2023 | Yang | B60N 3/001 108/44 |
| 11,724,631 B1 * | 8/2023 | Arnall | A47J 36/34 108/44 |
| 2004/0144196 A1 | 7/2004 | Thomas | |
| 2005/0076815 A1 * | 4/2005 | Twyford | B60N 3/005 108/44 |
| 2006/0107878 A1 * | 5/2006 | Cassata | B60N 3/005 108/44 |
| 2009/0084291 A1 * | 4/2009 | Long | B60N 3/005 108/44 |
| 2011/0056412 A1 | 3/2011 | Grammer et al. | |
| 2016/0157603 A1 * | 6/2016 | Graham | B60N 3/001 108/44 |
| 2018/0035800 A1 * | 2/2018 | Okeke | H04M 1/04 |
| 2020/0164781 A1 * | 5/2020 | Pascarella | B60R 9/06 |
| 2023/0126769 A1 * | 4/2023 | Bonslaver | B60R 5/045 108/44 |
| 2024/0075862 A1 * | 3/2024 | Muti | B60N 3/001 |

* cited by examiner

PORTABLE AND MODULAR VEHICLE TABLE ASSEMBLY

FIELD OF THE DISCLOSURE

The present disclosure generally relates to a multipurpose and modular table assembly for use with a motor vehicle in various configurations, as well as related components for a table system incorporating the same.

BACKGROUND OF THE DISCLOSURE

Vehicle owners are increasingly utilizing their vehicles in a number of ways that do not involve driving. Many vehicle owners state that they use their vehicles to relax, for privacy, and as a place to work, all while not driving, although the vehicle may be driven to various locations for these additional activities. With people increasingly seeking a more flexible lifestyle, there is a trend in individuals seeking out more experiences that vehicles can provide, meaning that the merge of adventure and work activities will be highly important capabilities of interest. In connection with these activities, vehicle users may desire a surface to eat from, a desk on which to use electronic devices and a table to organize camping gear, cameras, beverages, and the like. The use of a table surface in stationary moments can be beneficial in daily vehicle use and may be even more beneficial in off-road journeys, such as camping. In this respect, users may desire a single table in a multi-functional system that can be used in a number of non-driving situations in connection with a vehicle, such that multiple activities can be conducted using a single table to reduce storage or load requirements.

SUMMARY OF THE DISCLOSURE

According to one aspect of the present disclosure, a table assembly for a vehicle includes a first mounting bracket attachable on a first fixed vehicle component and a table body. The table body has a plurality of rigid segments joined together by a corresponding plurality of flexible joints. A first one of the flexible joints extends in a first direction and at least another of the flexible joints extends in a second direction perpendicular to the first direction. The table body is configured to be removably coupled with the first mounting bracket such that the first mounting bracket supports the table body in a generally horizontal position with the table body in a first configuration folded along the first flexible joint such that the at least another of the flexible joints is positioned to extend along one of the plurality of rigid segments.

Embodiments of the first aspect of the invention can include any one or a combination of the following features:
  The table body may include five rigid segments, with a first set of three rigid segments disposed on a first side of the first flexible joint and a second set of two rigid segments disposed on a second side of the first flexible joint. When in the first folded configuration, the first set of three rigid segments may overlie the second set of two rigid segments with a central one of the first set of three rigid segments in contact with both of the second set of two rigid segments.
  The first mounting bracket can be configured for attachment with a spoke of a vehicle steering wheel and is configured to receive the table body in the first folded configuration in a first orientation with the second set of two rigid segments positioned beneath the first set of three rigid segments.
  The first mounting bracket may include a base portion configured for engaging an open portion of the spoke of the steering wheel and a retention portion moveable into a retention position extending away from the base portion.
  The first mounting bracket can be configured for attachment with an exterior door handle of the vehicle and can be configured to receive the table body in the first folded configuration in a second orientation with the first set of three rigid segments positioned beneath the second set of two rigid segments such that first and second side segments of the first set of three rigid segments extend downwardly from the second set of two rigid segments to contact a portion of a vehicle door on which the exterior door handle is positioned.
  The table body can be moveable into a second folded condition in which the first set of three rigid segments overlie the second set of two rigid segments and in which an outer one of the first set of three rigid segments is positioned over a middle of the first set of three rigid segments by folding along a first of the at least another of the flexible segments and a first one of the second set of two rigid segments is positioned over a second one of the second set of two rigid segments by folding along a second of the at least another of the flexible segments.
  The table assembly can further include a support base, and the table body can be positionable on the support base in an unfolded configuration with each of the plurality of rigid segments generally co-planar with each other and spaced over a ground surface.
  The support base may include a support frame and four legs foldably supported with the support frame.
  The support base may include a first plurality of magnets, and ones of the plurality of rigid segments may include respective magnets magnetically coupleable with respective ones of the first plurality of magnets to maintain the table body in a supported position on the support base.
  The table body may include an internal support structure including a plurality of flat, rigid support segments and an outer cover of a flexible material that encloses the plurality of flat, rigid support segments to define the plurality of rigid segments and extends between ones of the plurality of flat, rigid segments to define at least some of the flexible joints.
  A first one of the flat, rigid support segments can be hingedly coupled with a second one of the flat, rigid support segments to define the first flexible joint.

According to another aspect of the present disclosure, a vehicle table system includes a table body having a plurality of rigid segments joined together by a corresponding plurality of flexible joints, a first one of the flexible joints extending in a first direction and at least another of the flexible joints extending in a second direction perpendicular to the first direction. The system also includes a first mounting bracket attachable with a spoke of a vehicle steering wheel and a second mounting bracket attachable with an exterior door handle of the vehicle. The first mounting bracket is configured to receive the table body in a first folded configuration in a first orientation with a second set of two rigid segments positioned beneath a first set of three rigid segments. The second mounting bracket is configured to receive the table body in the first folded configuration in a second orientation with the first set of three rigid segments positioned beneath the second set of two rigid segments such that first and second side segments of the first set of three rigid segments extend downwardly from the second set of two rigid segments to contact a portion of a vehicle door on which the exterior door handle is positioned.

According to another aspect of the present disclosure, a foldable table surface includes an internal support structure including a plurality of flat, rigid support segments and an outer cover of a flexible material that encloses the plurality of flat, rigid support segments to define a plurality of rigid segments and extends between ones of the plurality of flat, rigid segments to define at least one first flexible joint between adjacent rigid segments. A first one of the flat, rigid support segments is hingedly coupled with a second one of the flat, rigid support segments to define a second flexible joint. The first flexible joints extend in a first direction and the second flexible joint extends in a second direction perpendicular to the first direction. The table surface is configured to be removably coupled with a mounting bracket with the mounting bracket supporting the table surface in a generally horizontal position and with the table surface in a first configuration being folded along the second flexible joint such that the at least one of the second flexible joints is positioned to extend along one of the plurality of rigid segments.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
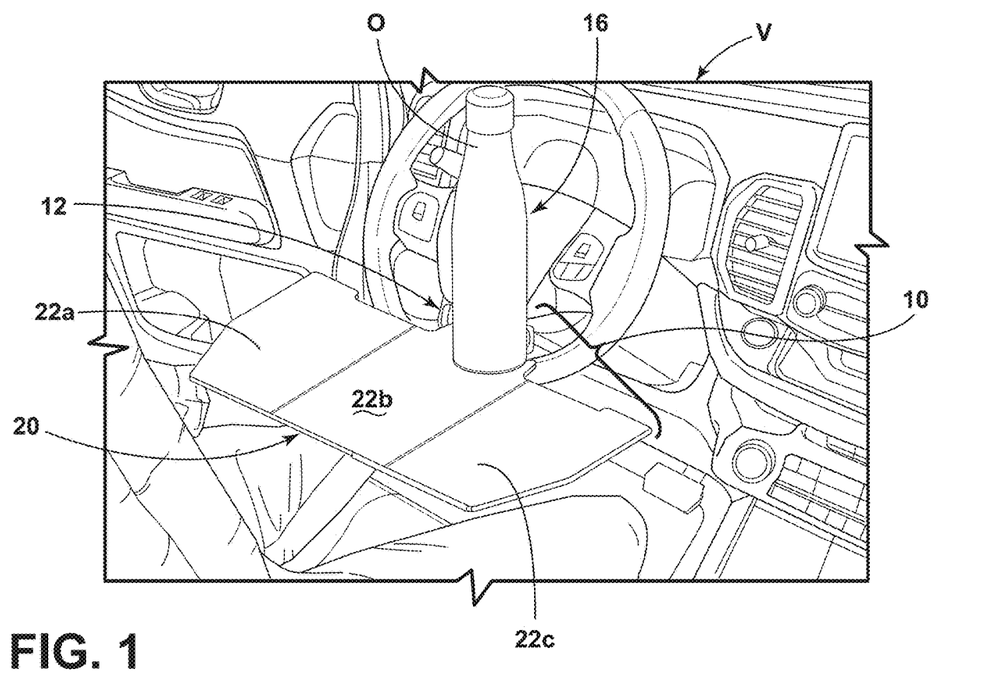
FIG. 1 is a perspective view of a vehicle interior including a table assembly and system according to an aspect of the present disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a table assembly 10 for a vehicle V. The table assembly 10 includes a mounting bracket, which can be one or both of the steering wheel mounting bracket 12 shown in FIGS. 1 and 7-12 or the door handle mounting bracket 14 shown in FIGS. 15-18. In this respect the mounting bracket 12 or 14 is characterized as being attachable on a first fixed vehicle component, which in the present examples is the vehicle steering wheel 16 and the exterior vehicle door handle 18 shown in the referenced figures, although other brackets could be developed or adapted according to the principles discussed herein. For example, in a vehicle with a horizontally-oriented and open trunk handle, the door handle mounting bracket 14 could be similarly used therewith. The assembly 10 also includes a table body 20 that in one aspect can be characterized as defining a table surface (or work surface) or table top, as discussed further below. The table body 20 has a plurality of rigid segments 22 joined together by a corresponding plurality of flexible joints 24. A first one of the flexible joints 24a extends in a first direction 26 and at least another of the flexible joints (any one of flexible joints 24b-24d, for example) extends in a second direction 28 perpendicular to the first direction 26. The table body 20 is configured to be removably coupled with the mounting bracket 12 or 14 such that the mounting bracket 12 or 14 supports the table body 20 in a generally horizontal position with the table body 20 in a first configuration folded along the first flexible joint 24a such that the at least another of the flexible joints 24b, 24c, or 24d is positioned to extend along one of the plurality of rigid segments 22.

In one aspect, the mounting brackets 12 and 14 and table body 20 discussed herein can be collectively included in a vehicle table system such that the single table body 20 is alternately/selectively useable with either the steering wheel mounting bracket 12 or the door handle mounting bracket 14 such that the same, single table body 20 can be used in multiple applications or settings with the associated vehicle V, as discussed further below. The arrangement of the table body 20, including the rigid segments 22 and flexible joints 24 allows for the table body 20 to be adaptable for these and additional uses, as discussed further herein, including within variations of the first configuration, as mentioned above and shown in FIG. 1.

Figure 2:
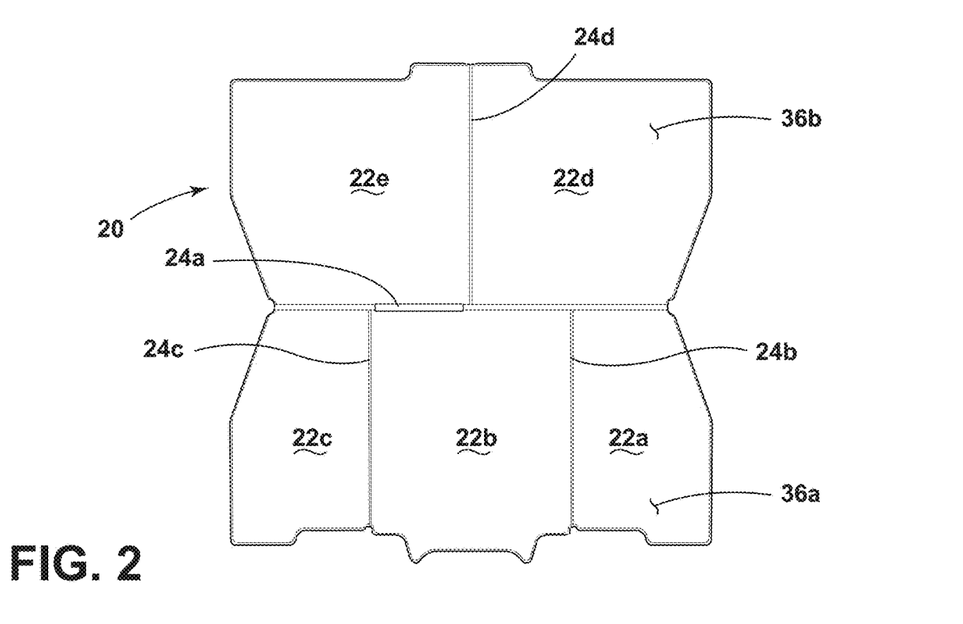
FIG. 2 is a top view of a table body of the system and assembly in an unfolded configuration.

As shown in FIG. 2, the table body 20 may include five rigid segments 22a-22e, with a first set of three rigid segments 22a, 22b, and 22c disposed on a first side of the first flexible joint 24a and a second set of two rigid segments 22d and 22e disposed on a second side of the first flexible joint 24a. When in the first folded configuration (shown in FIGS. 1 and 3), the first set of three rigid segments 22a, 22b, and 22c may overlie the second set of two rigid segments 22d and 22e with a central one 22b of the first set of three rigid segments 22a, 22b, and 22c in contact with both of the second set of two rigid segments 22d and 22e. As can be appreciated by the further discussion herein, the arrangement and relative positioning of the first set of three rigid segments 22a, 22b, and 22c and the second set of two rigid segments 22d and 22e can allow the table body 20 to maintain a generally rigid configuration for the support of various objects O thereon when supported by either the steering wheel mounting bracket 12 or the door handle mounting bracket 14.

Figure 4:
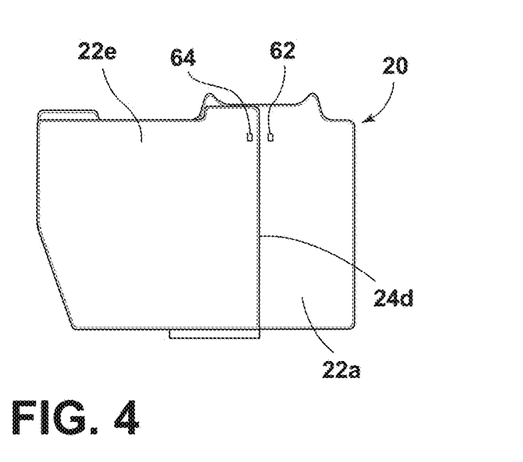
FIG. 4 is a top view of the table body of FIG. 2 in a second folded configuration.
Figure 5:
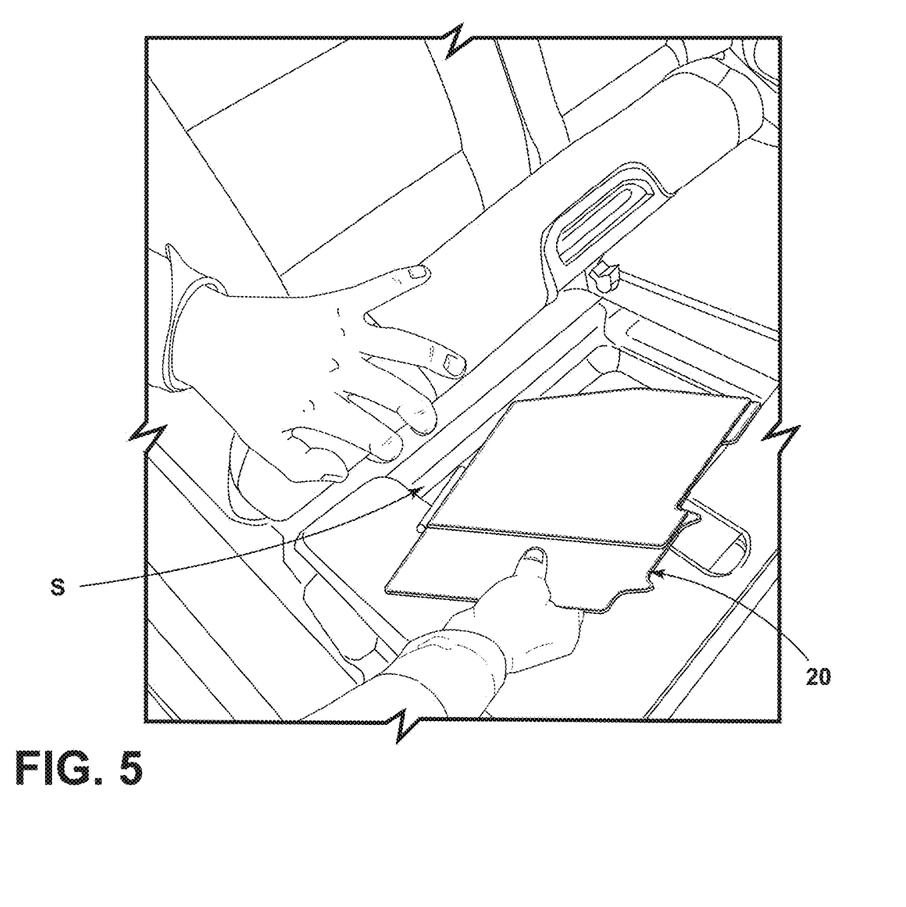
FIG. 5 is a perspective view of the table body in the second folded configuration being stowed within a vehicle compartment.

The arrangement of the first set of three rigid segments 22a, 22b, and 22c and the second set of two rigid segments 22d and 22e is, further, such that the table body 20 can be moveable into a second folded condition, shown in FIG. 4, in which the first set of three rigid segments 22a, 22b, and 22c overlie the second set of two rigid segments 22d and 22e (in a manner similar to the first folded condition) and in which an outer one 22c of the first set of three rigid segments 22a, 22b, and 22c is positioned over the central one 22b of the first set of three rigid segments 22a, 22b, and 22c by folding the table body 20 along flexible segment 24b and an adjacent one 22d of the second set of two rigid segments 22d and 22e is positioned over the other 22e of the second set of two rigid segments 22d and 22e by folding along flexible segment 24c. This arrangement can be used to configure the table body 20 in a compact arrangement suitable for storing the table body 20 in the vehicle V, including in an under-seat compartment C, shown in FIG. 5. This configuration may also make the table body 20 sized for stowing in a map pocket, trunk pocket/compartment or the like.

Figure 6A:
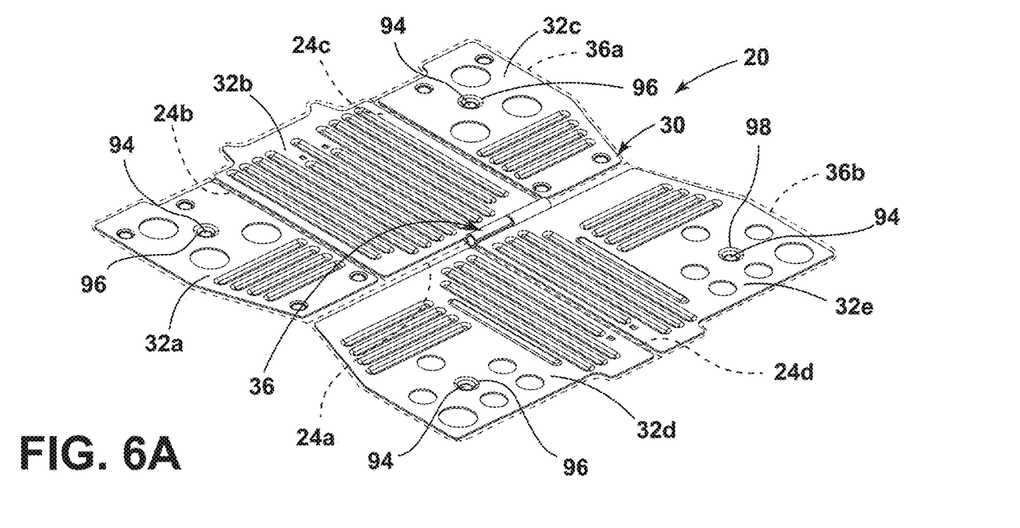
FIG. 6A is a perspective view showing an internal support structure of the table body in the unfolded configuration.
Figures 6B, 6C:
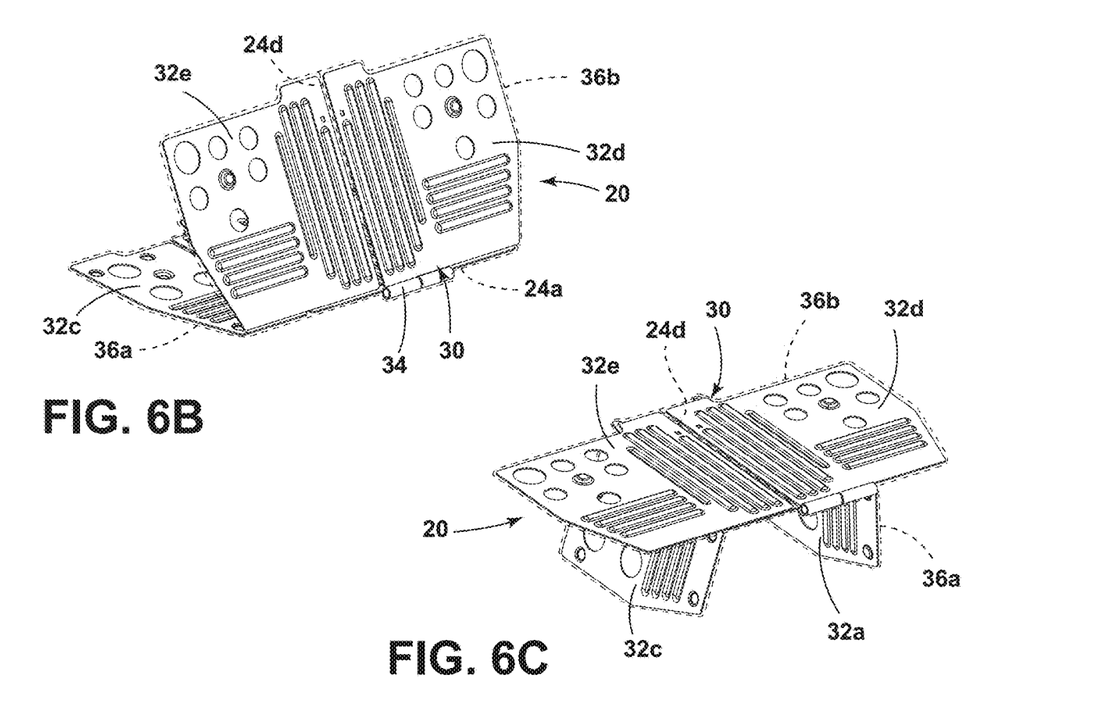
FIG. 6B is a perspective view showing the internal support structure of the table body in a transitional stage between the unfolded configuration and a folded configuration.
FIG. 6C is a perspective view showing the internal support structure of the table body in a variation of the folded configuration.
Figure 7:
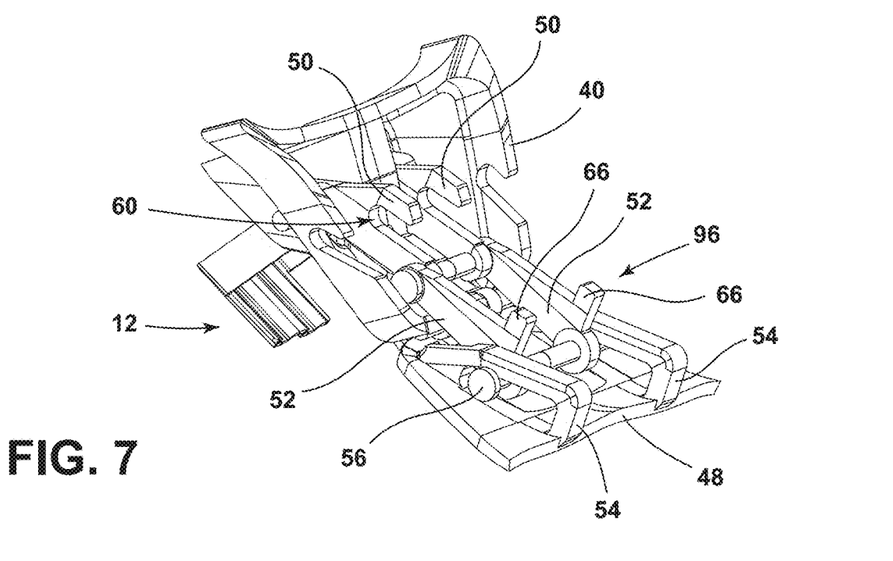
FIG. 7 is a perspective view of a steering wheel mounting bracket useable with the table body in the present system.

As shown in FIGS. 6A-6C, the table body 20 may include an internal support structure including a plurality of flat, rigid support segments 32a-32e that define and support the rigid segments 22 of the table body 20. In this respect, the support segments 32a-32e can be shaped similarly to the depicted rigid segments 22 can include a first set of three support segments 32a-32c and a second set of two support segments 32d and 32e. The support segments 32a-32e can be fabricated of metal, including aluminum, steel, or other alloys that provide suitable rigidity in a thin profile suitable for the folding configurations and use cases described herein. The support segments 32a-32e can include various holes 34 and ridges 36 to reduce the weight and strategically increase the stiffness of the support segments 32a-32e, which can lead to reduced weight and increased stiffness of the table body 20, overall. As shown, the middle support segments 32b in the first set of three support segments 32a, 32b, and 32c can be coupled with one of the support segments 32e in the second set of two support segments 32d and 32e by a hinge 34 to define the first flexible joint 24a, discussed above. In the illustrated example, the remaining support segments 32a, 32c, and 32d can be separated from the adjacent support segments. In this respect, the remaining flexible joints 24b, 24c, and 24d can be formed by portions of an outer cover 36 of a flexible material that encloses the plurality of flat, rigid support segments 32a-32e. In this arrangement, the flexible joints 24b, 24c, and 24d can be defined as living hinges that connect the rigid segments 22a and 22c to rigid segment 22b and connect rigid segment 22d to rigid segment 22e. The outer cover 36 can be of a flexible polymeric material, including vinyl, thermoplastic elastomer, polyurethane, or the like, as well as such materials with an embedded textile or textile backing. In one aspect, the outer cover 34 can include two separate portions 36a and 36b be associated, respectively with the first set of three rigid segments 22a, 22b, and 22c and the second set of two rigid segments 22d and 22e such that the folding of the table body 20 over the first flexible joint 24a by leaving the hinge 34 uncovered. Additionally, the cover portions 34a and 34b can be formed by two material sheets that are heat-sealed together both within the respective flexible joints 24b, 24c, and 24d and around the respective outer perimeters of the cover portions 34a and 34b. In additional example, all of the flexible joints 24a-24d can be defined by portions of the cover 34 or by respective additional hinges that are left unexposed by the cover portions.

As can be appreciated, the combination of flexible and rigid portions of the table body 20 achieved by this arrangement result in the table body 20 being moveable into the above-described unfolded configuration (FIG. 6A) and by folding about the first joint 24a, as shown in FIG. 6B. Once the table body 20 has been folded into the first folded configuration (FIG. 1), the outer two rigid segments 22a and 22c of the first set of three rigid segments 22a, 22b, and 22c remain moveable about the middle segment 22b by way of the corresponding flexible joints 24b and 24c, as shown in FIG. 6C. Similarly, one rigid segment 22d of the second set of two rigid segments 22d and 22e remains moveable about the associated flexible joint 24d. As discussed herein, the mounting brackets 12 and 14 are configured to selectively utilize and mitigate this flexibility to result in a suitably rigid table body 20 for the associated use cases.

Figure 8:
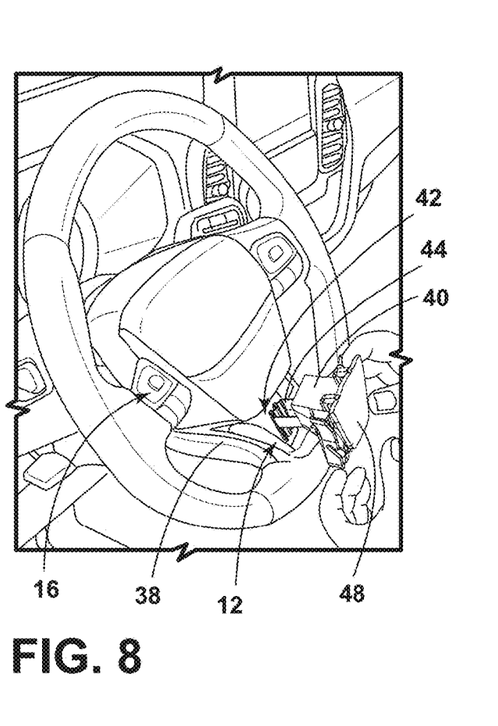
FIG. 8 is a perspective view of a first assembly state of the mounting bracket with a vehicle steering wheel.
Figure 9:
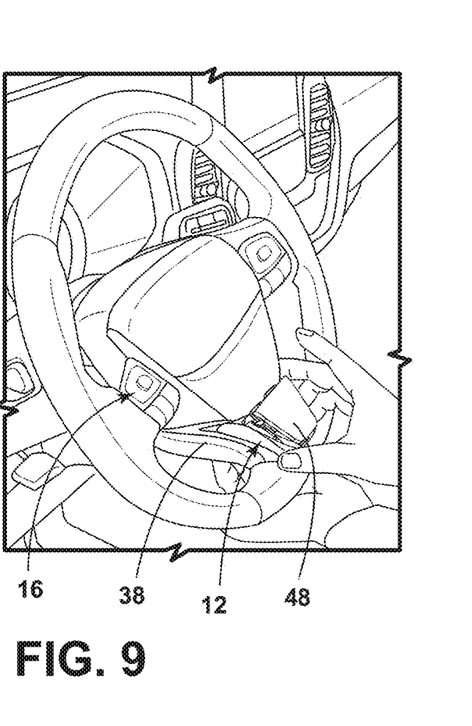
FIG. 9 is a perspective view of a second assembly state of the mounting bracket with the vehicle steering wheel.
Figure 10:
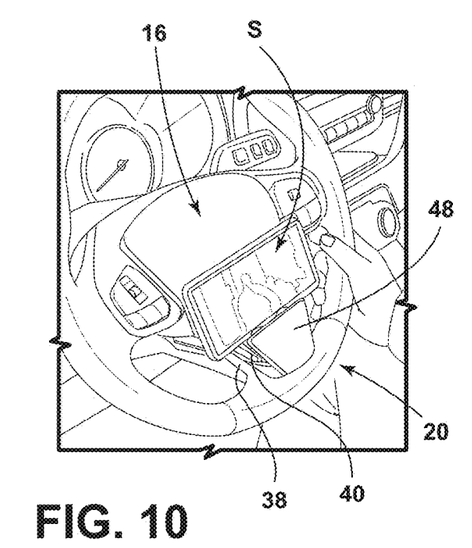
FIG. 10 is a perspective view of the mounting bracket assembled with the steering wheel in an alternative use case.
Figure 11A:
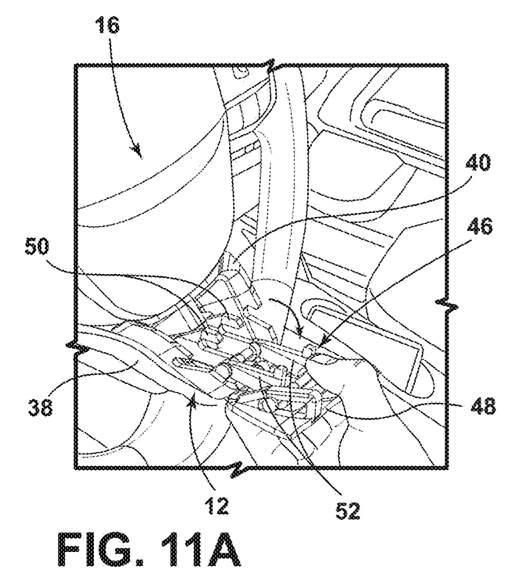
FIGS. 11A-11D are perspective views of the mounting bracket in stages of an assembly and use process of the table body therewith.
Figure 11B:
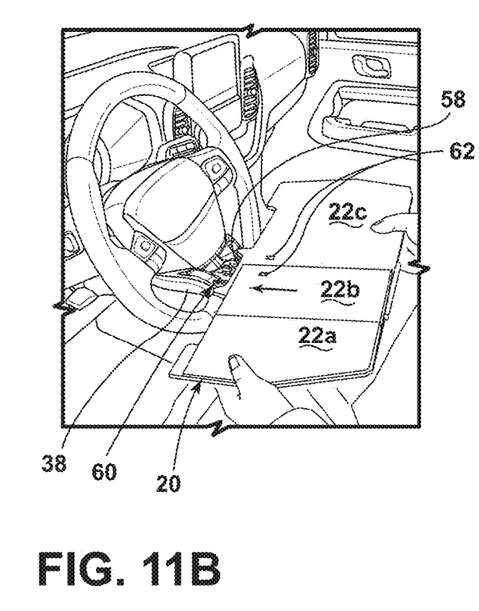
Figure 11C:
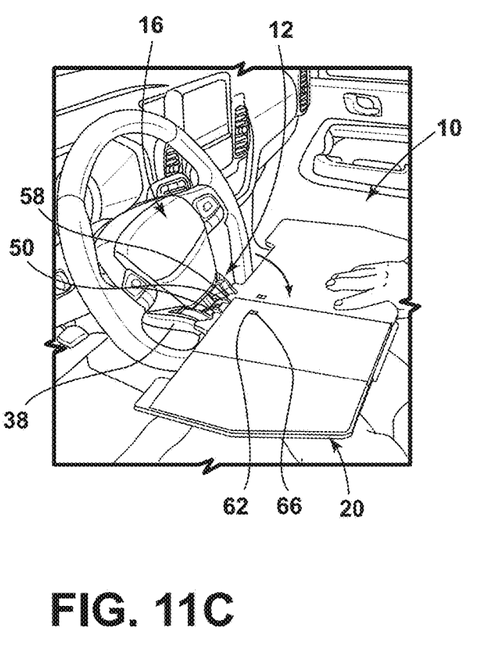
Figure 11D:
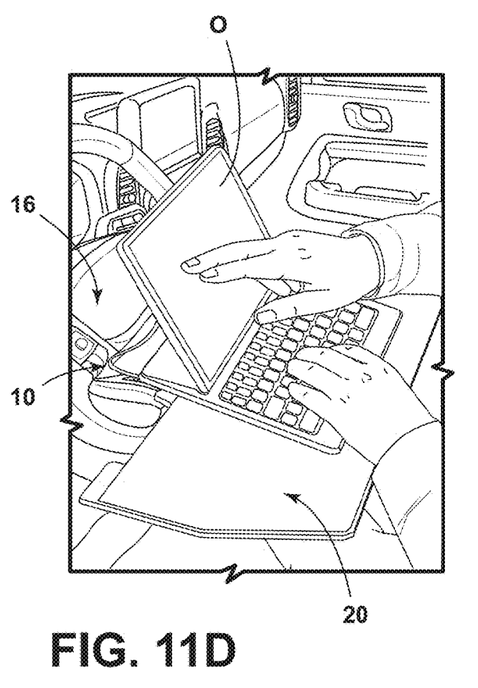
Figure 12:
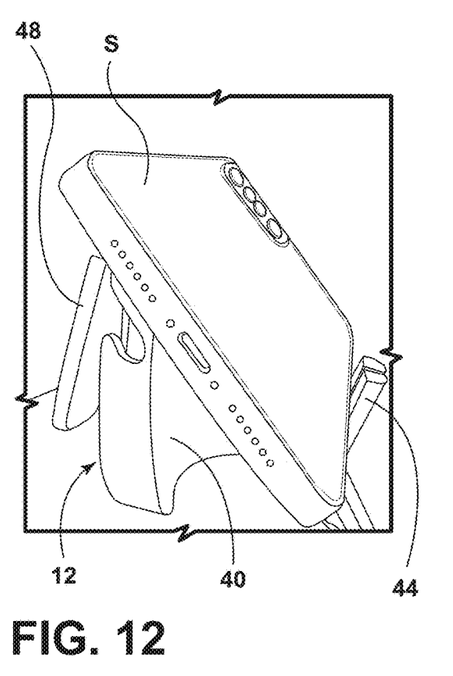
FIG. 12 is a perspective view of the mounting bracket disassembled from the steering wheel in an alternative use case.

Turning to FIGS. 7-12, the steering wheel mounting bracket 12 can be configured for attachment with a spoke 38 of the vehicle steering wheel 16 and is configured to receive the table body 20 in the first folded configuration (FIG. 3) in a first orientation with the second set of two rigid segments 22d and 22e positioned beneath the first set of three rigid segments 22a, 22b, and 22c, as shown in FIGS. 1 and 11C. More specifically, the steering wheel mounting bracket 12 includes a base portion 40 configured for engaging an open portion 42 of the spoke 38 of the steering wheel 16. In this respect, the base portion 40 is sized to correspond with the shape and configuration of the open portion 42 such that the base portion 40 can be securely received therein. The base portion 40 can be formed from rigid plastic and can, optionally, be coated with an elastomeric material to increase the frictional contact and to form a compliant fit with the open portion 42 of the spoke 38. A hook portion 44 can be movably coupled with the base portion 40 such that, upon alignment of the base portion 40 with the open portion 42 of the spoke 38 (as shown in FIG. 8), the hook portion 44 can be moved into an deployed position, wherein the hook portion 44 engages with a back side of the spoke 38 and/or with an adjacent portion of the steering wheel 16 to retain the base portion 40 within the spoke 38, as shown in FIG. 9.

A retention portion 46 is hingedly connected with the base portion 40 so as to be moveable between a stowed position (FIG. 9) adjacent the base portion 40 and a retention position (FIGS. 7 and 11A) extending away from the base portion 40. In this respect, the retention portion 46 can be an assembly of components, including a cover 48 that can be hingedly coupled with the base portion 40 to provide a finished appearance for the steering wheel mounting bracket 12 when assembled with the steering wheel 16 and in the stowed position. In this manner, the steering wheel mounting bracket 12 can be left in place within the steering wheel 16 when not in use. Additionally, the retention portion 46 can include a pair of channel members 50 fixedly coupled with the base portion 40, and a pair of tab arms 52 rotatably coupled with the channel members 50. The tab arms are coupled with the cover 40 by a sliding connection between slots 54 coupled with the cover 48 and an axle 56 that extends between the tab arms 52 and engages with the slots 54. In this arrangement, the offset between the connection of the cover 48 to the base portion 40 and the rotating attachment between the channel members 50 and the tab arms 52 maintains the retention portion 46 in the retention position with sufficient strength to support the table body 20 and a reasonable amount/weight of objects O supported thereon.

As shown in FIG. 10, the internal friction within the connection between the retention portion 46 and the base portion 40 can be sufficient to retain the retention portion 46 in an intermediate position that can be used to support a smartphone S or the like in a viewing position on the steering wheel 16 when the vehicle V is not being driven. When the vehicle V is in park with the ignition turned off, the steering wheel bracket 12 can be further moved into the retention position (FIG. 11A) and the table body 20 can be assembled therewith. In particular, a distal edge 58 of the table body 20 in the first folded condition can be aligned with a channel 60 collectively defined by the channel members 50. In particular, the edge 58 can be aligned with the channel 60 such that a central portion thereof is received in the channel 60, the central portion being within the middle one 22b of the first set of three rigid segments 22a, 22b, and 22c and spanning the flexible joint 24d between the second set of two rigid segments 22d and 22e. The table body 20 can further include a first set of apertures 62, with one each, respectively, disposed in rigid segments 22d and 22e and a second set of apertures 64 both disposed in the middle segment 22b of the first set of three rigid segments 22a, 22b, and 22c. In this manner, the steering wheel mounting bracket 12 includes a first set of tabs 66 respectively received through the first apertures 62 and extending into the second apertures 64 when the edge 58 is received in the channel 60. In this arrangement, the channel 60 and the tab arms 52 collectively support the table body 20 in a cantilever arrangement on the steering wheel 16 (FIG. 11C) and the engagement of the tabs 66 with the apertures 62 and 64 helps maintain the edge 58 of the table body 20 in engagement with the channel 60 and the table body 20 in the desired alignment with the steering wheel mounting bracket 12. In particular, the depicted positioning of the table body 20 is such that the second set of two rigid segments 22d and 22e are respectively supported by tab arms 52 with the downward pressure of rigid portion 22b over flexible joint 24d by the channel 60 maintaining the second set of two rigid segments 22d and 22e in a generally co-planar and horizontal arrangement (with some sag, such as up to about 2° from horizontal) being generally acceptable. Additionally, the support of the second set of two rigid segments 22d and 22e can be such that rigid segments 22a and 22c are supported thereby. As shown in FIG. 1 ID, this arrangement can be useable to support objects O on the table assembly 10 for use by the occupant of the parked vehicle, including as a mobile workspace and/or for eating or the like during camping in or with the vehicle V. In this respect, the table body 20, when in the folded configuration of FIG. 3, for example, can have an inwardly-tapered profile in the direction 28 away from the edge 58, to remove protruding corners that could be in a disadvantageous position within the limited confines of the vehicle V cabin.

In one example, the base portion 40 can be specifically configured for a desired vehicle with an open spoke arrangement, including to fit closely therein. Similarly, the cover 48 can be configured to enclose the open area 42 or to otherwise provide a desired finished appearance. In such an example, a manufacturer can provide a plurality of different base portions 40 and cover 48 that can be assembled with standardized channel members 50 and tab arms 52 to provide the desired supporting arrangement for various vehicles. In a further variation, the manufacturer can provide the assembled channel members 50, tab arms 52, and axle 56, while making available three-dimensional modeling data that can be used to 3-D print vehicle-specific base and cover portions 40 and 48, including by the end-user/vehicle owner. In a further aspect of the use of steering wheel mounting bracket 12 shown in FIG. 12, the bracket 12 can be used when disassembled from the steering wheel 16 for supporting smartphone S on a surface, including on the table body 20 when used in another arrangement.

Figure 13:
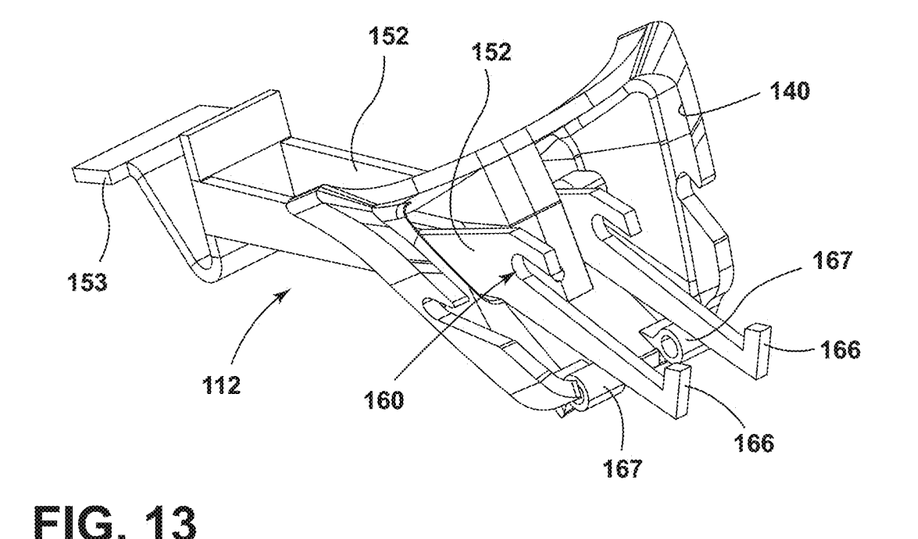
FIG. 13 is a perspective view of an alternative steering wheel mounting bracket useable with the table body in a variation of the present system.
Figure 14:
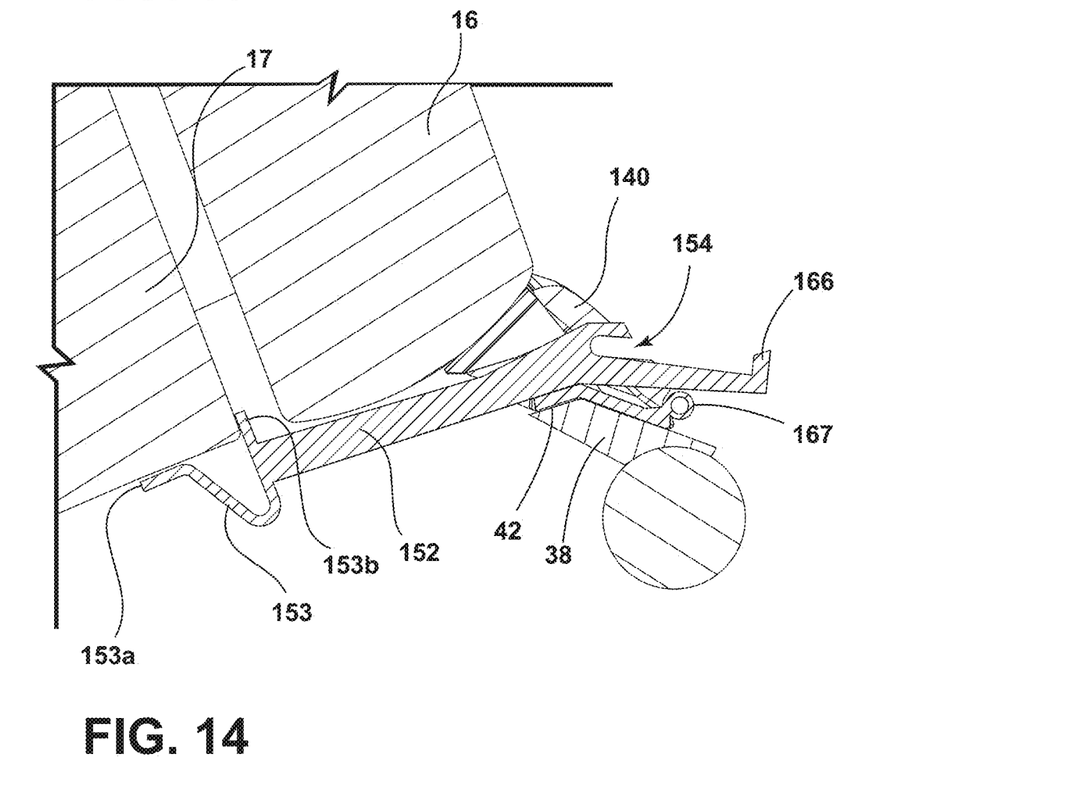
FIG. 14 is a perspective view of the alternative mounting bracket assembled with the steering wheel in an alternative use case.
Figure 15:
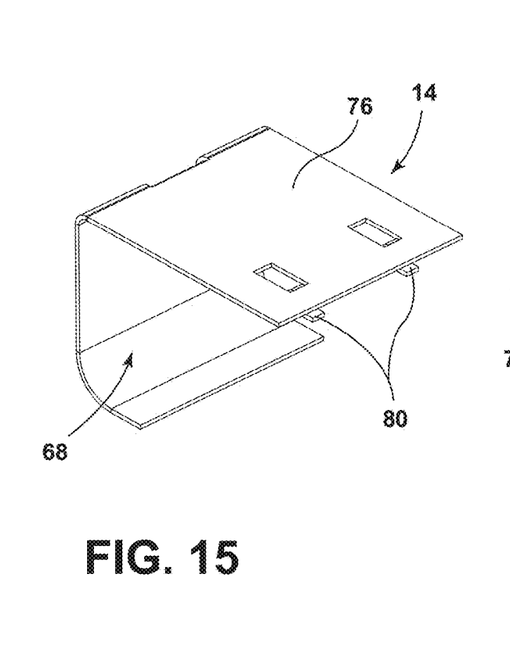
FIGS. 15 and 16 are perspective views of a door handle mounting bracket useable with the table body in the present system.

As shown in FIGS. 13 and 14, an alternative steering wheel mounting bracket 112 can be configured for installation with in the open portion 42 of the steering wheel spoke 38 only when desired for use with in supporting the table body 20 on the steering wheel 16. In this respect, the steering wheel mounting bracket 112 is not reconfigurable into a stowed condition, such as that of the former steering wheel mounting bracket 112, discussed above. Rather, the present steering wheel mounting bracket 112 is configured for storage within the vehicle V, such as in a center-console compartment, a glove box, or the like, while not in use and for assembly with the steering wheel spoke 38 when the vehicle is parked and the use of the table assembly 10 is desired. In this manner, the mounting bracket 112 includes a base portion 140 that is similarly configured to fit within the open portion 42 of the steering wheel spoke 38 to generally retain the mounting bracket 112 in the desired position relative to the steering wheel 16. As shown, the tab arms 152 are elongated relative to those of bracket 12 and extend through the base portion 140 and are joined by a compliant end fitting 153. In this manner, the connection of the tab arms 152 by the end fitting 153 and the shape of the proximal ends of the tab arms 152 (on which the slots 154 that partially define channel 160 and the tabs 166 are positioned) keep the tab arms 152 assembled with the base portion 140, with which the fit therebetween is otherwise generally loose to provide ease of assembly.

As shown in FIG. 14, when the base portion 140 is assembled with the steering wheel 16 by a press-fit thereof in the open portion 42 of the steering wheel spoke 38, the tab arms 152 can be positioned such that the end fitting 153 engages a portion of the steering wheel 16 and/or the steering column 17 beyond the spoke 38. In the illustrated example an end tab 153a of the end fitting 153 contacts a lower surface of the steering column 17, and an upper tab 153b contacts the front face of the steering column 17 in a gap between the back of the steering wheel 16 and the front face of the steering column 17. In either arrangement, the engagement of the end fitting 153 with the steering wheel 16 and/or steering column 17 requires that the steering wheel 16 be in a centered positioned during installation and use of the mounting bracket 112. As further shown, the engagement of the end fitting 153 positions the tab arms 152 such that they can rest against the base portion 140 to align the slots 154 for proper alignment of the channel 160. In this arrangement, the ends of the tab arms 152 adjacent the tabs 166 rest on supports 167 integrally formed with the base portion 140. This arrangement helps maintain proper orientation of the channel 160 and the tabs 166 for support of the table body 20 thereon in a similar manner to the bracket 12 discussed above. Additionally, the depicted shape of the tab arms 152 is such that the force of the table body 20 and any objects thereon presses the tab arms 152 against the supports 167 to further urge the base portion 140 into its press-fit arrangement with the open portion 42 of the steering wheel spoke 38. When use of the table body 20 is no longer desired, the table body 20 can be removed, folded, and stowed before removal of the mounting bracket 112 from the steering wheel 16 for storage.

Figure 3:
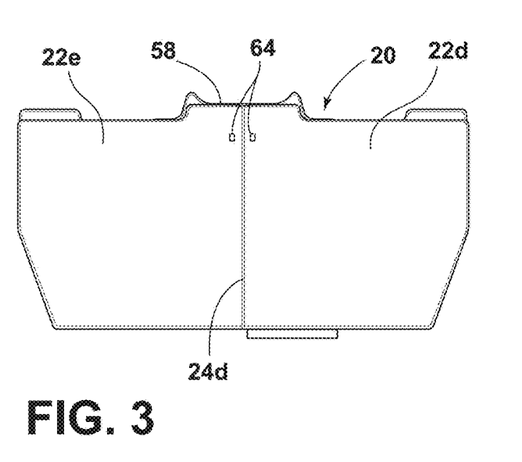
FIG. 3 is a top view of the table body of FIG. 2 in a first folded configuration.
Figure 16:
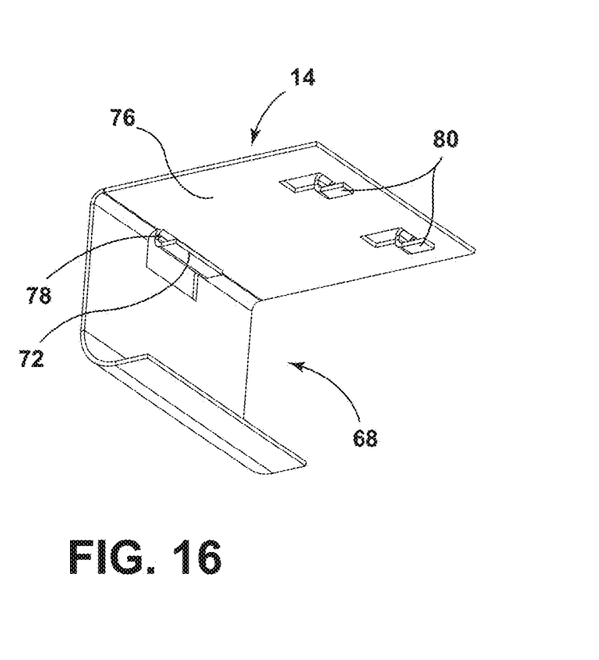

Turning now to FIGS. 15-18, the door handle mounting bracket 14 is configured for attachment with the exterior door handle 18 of the vehicle V. As shown, the bracket 14 is generally in an extruded "C" shape with an inner open area 68 that is generally large enough to fit over a wide array of vehicle door handles 18 having a fixed, open configuration such that the door handle mounting bracket 14 does not necessarily utilize the same customized shape/structure as the above-described example of the steering wheel bracket 12. Similar to the steering wheel mounting bracket 12 discussed above, the door handle mounting bracket 14 is configured to receive the table body 20 in the first folded configuration (FIG. 3). As shown in FIG. 16, the table body 20 is supported by the door handle mounting bracket 14 in a second orientation that is inverted relative to the orientation with which it is received by the steering wheel mounting bracket 12. Specifically, the present door handle mounting bracket 14 is configured to receive the table body 20 with the first set of three rigid segments 22a, 22b, and 22c positioned beneath the second set of two rigid segments 22d and 22e such that first and second side segments 22a and 22c of the first set of three rigid segments 22a, 22b, and 22c extend downwardly from the second set of two rigid segments 22d and 22e to contact a portion of a vehicle door 70 on which the exterior door handle 18 is positioned. In this manner, the door handle mounting bracket 14 is not solely responsible for maintaining the table body 20 in the depicted horizontal position and can, thus, be configured with a larger tolerance than, for example, the steering wheel mounting bracket 12.

Figure 17:
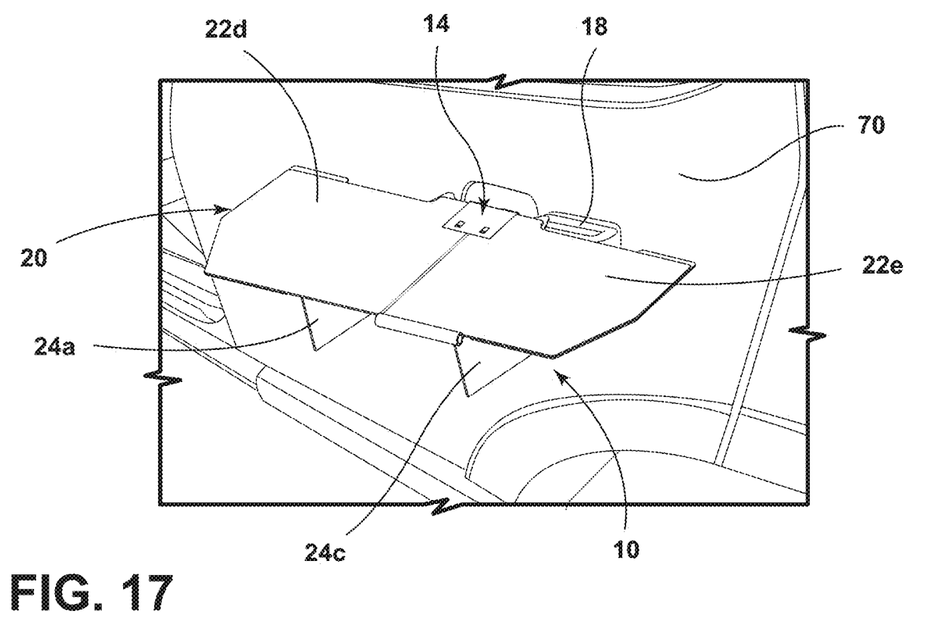
FIG. 17 is a perspective view of the table body assembled with the door handle mounting bracket.
Figure 18:
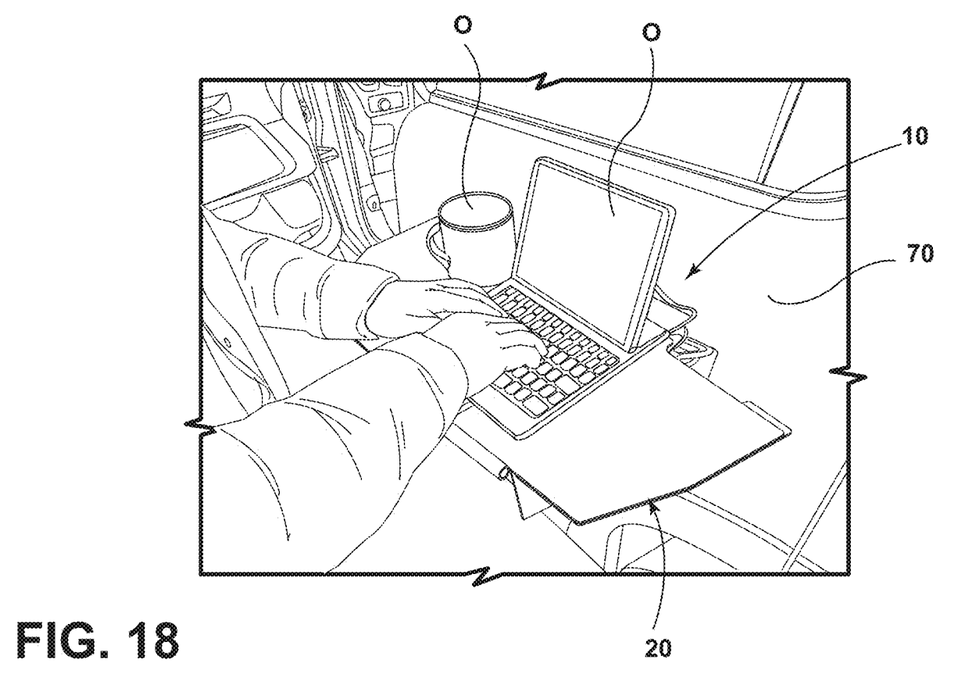
FIG. 18 is a perspective view of the assembled table body and door handle mounting bracket in a use case.

As shown in FIG. 16, the door handle mounting bracket 14 includes an interior tab 72 that extends beneath an upper flange 76 of the C-shaped profile to define a channel 78 that receives the edge 58 of the table body 20 in a manner similar to the channel 60 discussed above, including by urging the middle panel 22b against the second set of two rigid segments 22d and 22e to maintain the flat arrangement thereof shown in FIGS. 17 and 18. Additionally, a pair of prongs 80 extend initially downwardly from the upper flange 76 and then parallel therewith in a direction away from the channel 78. In this manner the table body 20 can be assembled with the door handle mounting bracket 14 by aligning the edge 58 with the channel 78 and then engaging the prongs 80 with both pairs of apertures 62 and 64 such that the prongs 80 extend therethrough, with the downward-extending portions thereof preventing outward movement of the table body 20 that would disengage the edge 58 from the channel 78. In this manner, objects O may be supported on the table body 20 under the support of the attachment with the door handle mounting bracket 14 and the contact of second set of two rigid segments 22d and 22e with the vehicle door 70.

Figure 19:
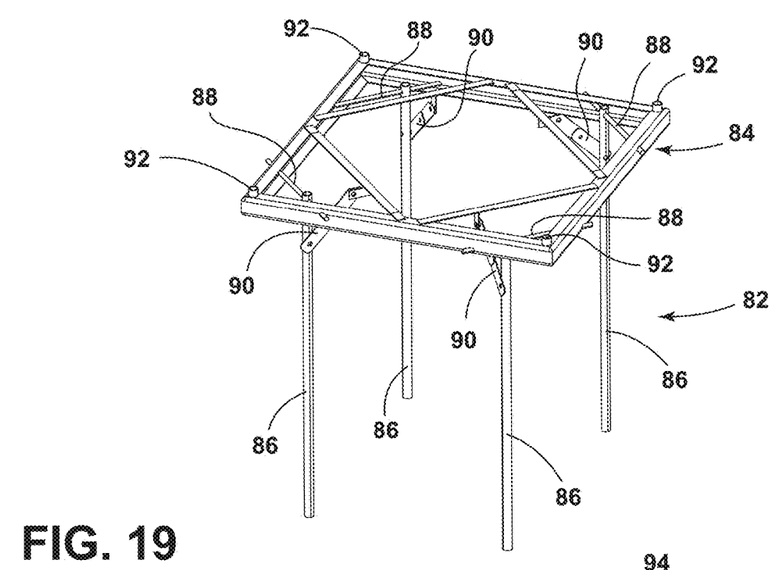
FIG. 19 is a perspective view of a support base further useable with the table body in the present system.
Figure 20A:
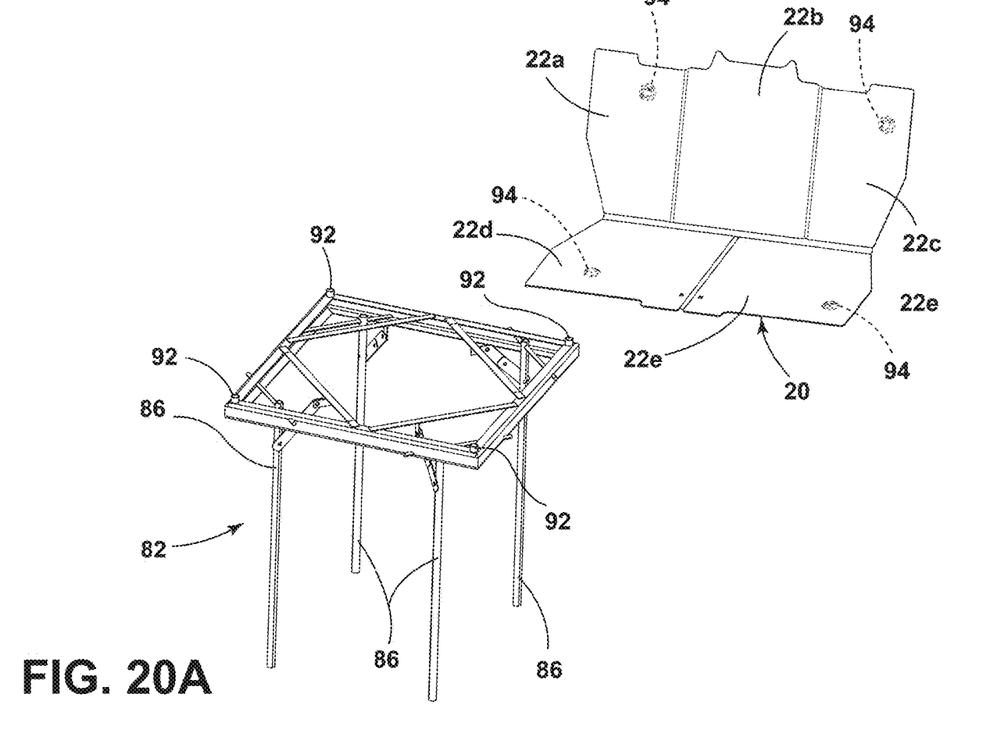
FIGS. 20A and 20B are perspective views of the support base positioned on a ground surface during assembly and use stages of the table body therewith.
Figure 20B:
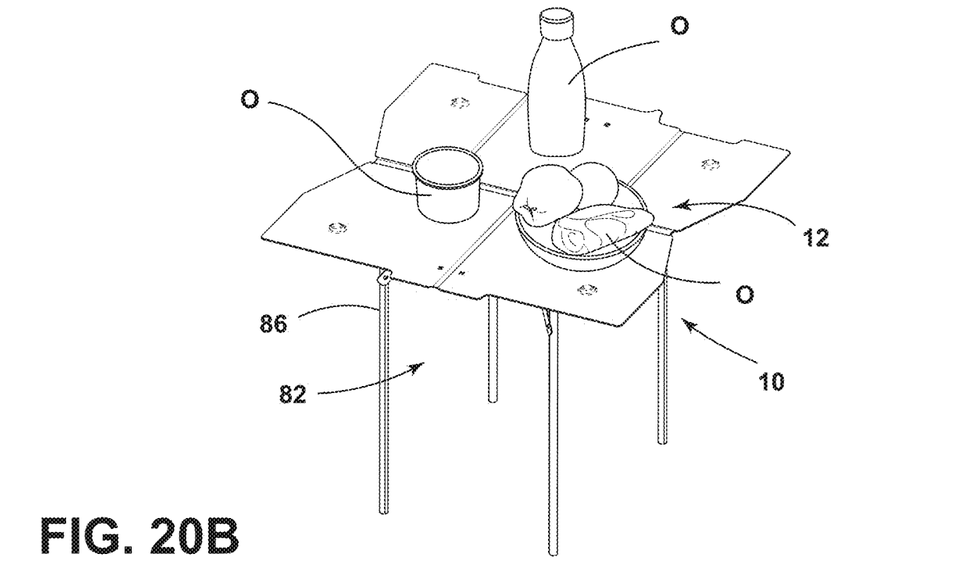
Figure 21:
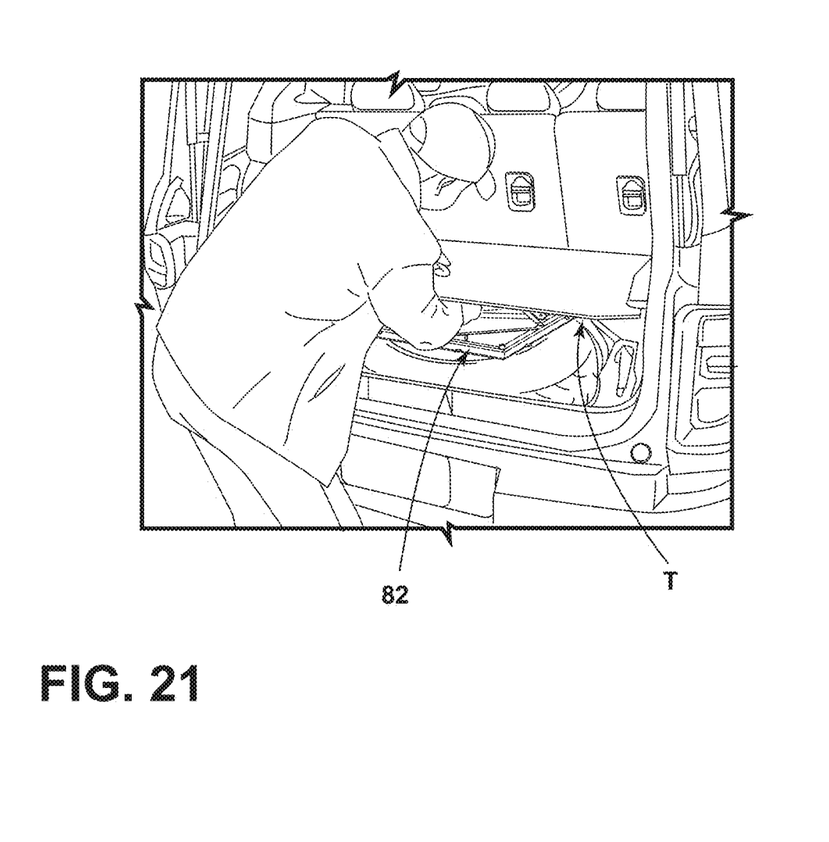
FIG. 21 is a perspective view of the support base in a folded configuration during storage within a vehicle compartment.

Turning to FIGS. 19-21, the table assembly 10 and/or the system described herein can further include a support base 82 that can support the table body 20 in the unfolded configuration shown in FIG. 2 with each of the plurality of rigid segments 22a-22e generally co-planar with each other and spaced over a ground surface G on which the support base 82 is positioned. As shown in FIG. 19, the support base 82 includes a support frame 84 with four legs 86 foldably supported (or otherwise configured to be stowed) with the support frame 84. As shown, the legs 86 can be mounted on tubular frame members 88 such that they are rotatable toward the support frame 84 to facilitate a generally flat arrangement of the support base 82, as shown in FIG. 21, that allows the support base 82 to be stowed in the vehicle V, including in a trunk compartment C thereof. The support base 82 can also include folding brace members 90 attached between the legs 86 and the support frame 84 to maintain the legs 86 in the extended position shown in FIG. 19. As shown in FIG. 20A, the support frame 84 can be unfolded and placed on ground surface G. The table body 20 can then be unfolded and aligned over the support frame 84 before being placed thereon in a supported manner, show in FIG. 20B. In this manner, the support frame 84 can be sized to be large enough to extend past respective mid points of each of the rigid segments 22a-22e to maintain the table body 20 in the depicted flat arrangement. Additionally, the support base 82 may include a first plurality of magnets 92 at corners of the support frame 84. Ones of the plurality of rigid segments 22a-22e that align with the magnets 92 (segments 22a, 22c, 22d, and 22e in the present example) may include additional magnets 94 therein (including by being received or coupled in detents 94 within the corresponding support segments 34a, 34c, 34d, and 34e). The additional magnets 94 are, accordingly, magnetically coupleable with respective ones of the first plurality of magnets 92 to maintain the table body 20 in a supported position on the support base 82, as shown in FIG. 20B, including under a reasonable object O weight thereon.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A table assembly for a vehicle, comprising:
a first mounting bracket attachable on a first fixed vehicle component;
a table body, including five rigid segments joined together by a corresponding plurality of flexible joints, a first one of the flexible joints extending in a first direction and at least another of the flexible joints extending in a second direction perpendicular to the first direction, wherein:
a first set of three rigid segments are disposed on a first side of the first flexible joint and a second set of two rigid segments are disposed on a second side of the first flexible joint;
the table body is configured to be removably coupled with the first mounting bracket such that the first mounting bracket supports the table body in a generally horizontal position with the table body in a first folded configuration along the first flexible joint and with the at least another of the flexible joints positioned to extend along one of the plurality of rigid segments; and
when in the first folded configuration, the first set of three rigid segments overlies the second set of two rigid segments with a central one of the first set of three rigid segments in contact with both of the second set of two rigid segments.

2. The table assembly of claim 1, wherein the first mounting bracket is configured for attachment with a spoke of a vehicle steering wheel and is configured to receive the table body in the first folded configuration in a first orientation with the second set of two rigid segments positioned beneath the first set of three rigid segments.

3. The table assembly of claim 2, wherein the first mounting bracket includes a base portion configured for engaging an open portion of the spoke of the steering wheel and a retention portion hingedly connected with the base portion and moveable into a retention position extending away from the base portion and engaged with an adjacent portion of the steering wheel opposite the base portion.

4. The table assembly of claim 1, wherein the first mounting bracket is configured for attachment with an exterior door handle of the vehicle and is configured to receive the table body in the first folded configuration in a second orientation with the first set of three rigid segments positioned beneath the second set of two rigid segments such that first and second side segments of the first set of three rigid segments extend downwardly from the second set of two rigid segments to contact a portion of a door of the vehicle on which the exterior door handle is positioned.

5. The table assembly of claim 1, wherein the table body is moveable into a second folded condition in which the first set of three rigid segments overlie the second set of two rigid segments and in which an outer one of the first set of three rigid segments is positioned over a middle of the first set of three rigid segments by folding along a first of the at least another of the flexible joints and a first one of the second set of two rigid segments is positioned over a second one of the second set of two rigid segments by folding along a second of the at least another of the flexible joints.

6. The table assembly of claim 1, further including a support base, wherein:
the table body is positionable on the support base in an unfolded configuration with each of the plurality of rigid segments generally co-planar with each other and spaced over a ground surface.

7. The table assembly of claim 6, wherein the support base includes a support frame and four legs foldably supported with the support frame.

8. The table assembly of claim 7, wherein:
the support base includes a first plurality of magnets; and
ones of the plurality of rigid segments include respective magnets magnetically coupleable with respective ones of the first plurality of magnets to maintain the table body in a supported position on the support base.

9. The table assembly of claim 1, wherein the table body includes:
an internal support structure including a plurality of flat, rigid support segments; and
an outer cover of a flexible material that encloses the plurality of flat, rigid support segments to define the plurality of rigid segments and extends between ones of the plurality of flat, rigid segments to define at least some of the flexible joints.

10. The table assembly of claim 9, wherein a first one of the flat, rigid support segments is hingedly coupled with a second one of the flat, rigid support segments to define the first flexible joint.

11. A table system for a vehicle, comprising:
a table body, including a plurality of rigid segments joined together by a corresponding plurality of flexible joints, a first one of the flexible joints extending in a first direction and at least another of the flexible joints extending in a second direction perpendicular to the first direction,
a first mounting bracket attachable with a spoke of a vehicle steering wheel and configured to receive the table body in a first folded configuration in a first orientation with a second set of two rigid segments positioned beneath a first set of three rigid segments; and
a second mounting bracket attachable with an exterior door handle of the vehicle and configured to receive the table body in the first folded configuration in a second orientation with the first set of three rigid segments positioned beneath the second set of two rigid segments such that first and second side segments of the first set of three rigid segments extend downwardly from the second set of two rigid segments to contact a portion of a door of the vehicle on which the exterior door handle is positioned.

12. The system of claim 11, wherein the first folded configuration is such that the table body is folded along the first flexible joint such that the at least another of the flexible joints is positioned to extend along one of the plurality of rigid segments.

13. The system of claim 11, wherein the first mounting bracket includes a base portion configured for engaging an open portion of the spoke of the steering wheel and a retention portion hingedly connected with the base portion and moveable between a stowed position adjacent the base portion and a retention position extending away from the base portion.

14. The system of claim 11, wherein:
the table body includes five rigid segments, with a first set of three rigid segments disposed on a first side of the first flexible joint and a second set of two rigid segments disposed on a second side of the first flexible joints; and
when in the first folded configuration, the first set of three rigid segments overlie the second set of two rigid segments with a central one of the first set of three rigid segments in contact with both of the second set of two rigid segments.

15. The system of claim 14, further including a first set of apertures respectively disposed in a first one and a second one of the second set of two rigid segments and a second set of apertures in a middle one of the first set of three rigid segments, wherein:
the first mounting bracket includes a set of tabs respectively received in ones of the first set of apertures when the table body is received by the first mounting bracket; and
the second mounting bracket includes a set of prongs respectively received in ones of the second set of apertures when the table body is received by the second mounting bracket.

16. The system of claim 11, further including a support base, wherein:
the table body is positionable on the support base in an unfolded configuration with each of the plurality of rigid segments generally co-planar with each other and spaced over a ground surface.

17. The system of claim 16, wherein the support base includes a support frame and four legs foldably supported with the support frame.

18. The system of claim 17, wherein:
the support base includes a first plurality of magnets; and
ones of the plurality of rigid segments include respective magnets magnetically coupleable with respective ones of the first plurality of magnets to maintain the table body in a supported position on the support base.

19. A foldable table surface, comprising:
an internal support structure including a plurality of flat, rigid support segments; and
an outer cover of a flexible material that encloses the plurality of flat, rigid support segments to define a plurality of rigid segments and extends between ones of the plurality of flat, rigid segments to define at least one first flexible joint between adjacent rigid segments, wherein:
a first one of the flat, rigid support segments is hingedly coupled with a second one of the flat, rigid support segments to define a second flexible joint, the first flexible joints extending in a first direction and the second flexible joint extending in a second direction perpendicular to the first direction; and
the table surface is configured to be removably coupled with a mounting bracket such that the mounting bracket supports the table surface in a generally horizontal position with the table surface in a first folded configuration along the second flexible joint such that the at least one of the second flexible joints is positioned to extend along one of the plurality of rigid segments.

\* \* \* \* \*